United States Patent Office 3,117,135
Patented Jan. 7, 1964

3,117,135
UNSYMMETRICAL FORMALS CONTAINING THE 3,4-METHYLENEDIOXYPHENYL GROUP STABILIZED AGAINST DISPROPORTIONATION AND METHOD OF PRODUCING SAME
Oscar F. Hedenburg, Pittsburgh, Pa., assignor to Rex Research Corporation, Toledo, Ohio, a corporation of Delaware
No Drawing. Filed July 20, 1960, Ser. No. 44,009
10 Claims. (Cl. 260—340.5)

This invention relates to new chemical compounds especially valuable for use in insecticidal compositions as synergists for the insecticidal effectiveness of pyrethrins, allethrin, and other insecticidally active compounds closely related to pyrethrins and allethrin, for instance, cyclethrin and furethrin. The invention includes the new chemical compounds, per se, and an effective method for producing them and also insecticidal compositions synergized by one or more of these new compounds.

The compounds of my present invention are produced by the interaction, in the presence of a strong, nonvolatile acid, of either dihydrosafrole or safrole and formaldehyde and an alcohol of the formula $$R-[-O-(CH_2)_m-]_n-OH$$

in which R represents alkyl of from 1 to 4 carbon atoms, $m$ is an integer 2 or 3 and $n$ is an integer 1 or 2.

In my U.S. Patent 2,521,366, there are described and claimed insecticidal synergists and a method for producing these synergists comprising reacting at an elevated temperature, in the presence of a strong, nonvolatile acid catalyst, one mole of safrole, 2 moles formaldehyde and one mole of an alcohol of the formula $$RO(CH_2-CH_2-O)_nH$$

in which R is alkyl of from 1 to 4 carbon atoms and $n$ is the integer 1 or 2. The reaction is there said to result in the attaching of one of the alcohol radicals at the double bond of the allyl side chain of the safrole radical through a —CH$_2$—O—CH$_2$—O— linkage.

The compounds of my present invention are primarily distinguished from those described in my said patent in that they result from a reaction occurring at the nucleus of the benzene ring, rather than at the double bond of the side chain. In fact, in accordance with my present invention, the reaction is the same where the methylenedioxyphenyl compound is dihydrosafrole, in which the side chain contains no double bonds, as it is where the methylenedioxyphenyl compound is safrole.

More particularly, the compounds of my present invention may be represented structurally by the graphic formula:

(1)
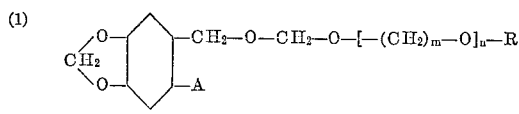

in which A represents either normal propyl, as in dihydrosafrole, or allyl as in safrole, and R, $m$ and $n$ are as previously indicated herein.

These compounds are produced in accordance with my present invention by the interaction of one molecule of dihydrosafrole or of safrole, one molecule of the alcohol and two molecules of formaldehyde, in the presence of a strong, nonvolatile acid catalyst and a substantial excess of both the formaldehyde and the alcohol over the proportions just indicated, as hereinafter more fully described.

The reaction, where dihydrosafrole, for instance, is used, appears to proceed as follows:

(2)
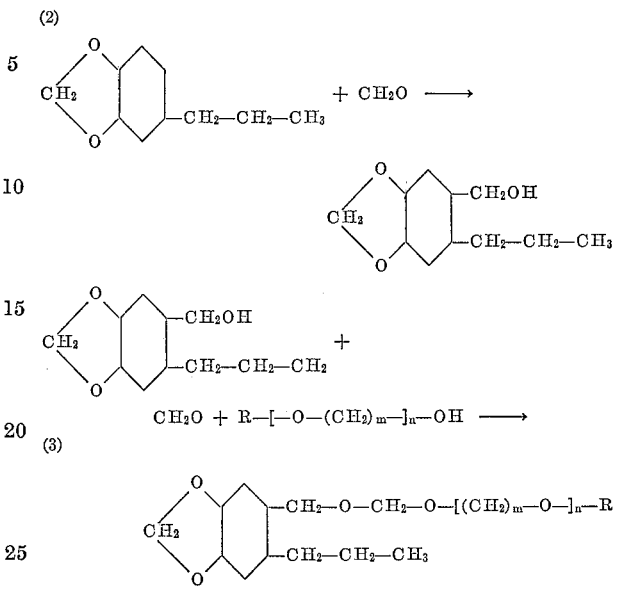

$$CH_2O + R-[-O-(CH_2)_m-]_n-OH \longrightarrow$$

(3)
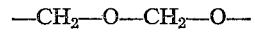

R, $m$ and $n$ being as previously indicated.

The reaction when safrole is used has been found to be the same as that just described.

The product of the above-described reaction will be recognized as an unsymmertical formal, the benzene nucleus of the dihydrosafrole radical X being joined to the alcohol radical Y by the formal linkage

—CH$_2$—O—CH$_2$—O—

These unsymmetrical formals have been found to be unstable in that they disproportionate, or partially rearrange, into two possible types of symmetrical formals. Such disproportionation is especially rapid in the presence of the strong acid catalyst used to promote the primary reaction.

The three possible types of formals may be represented as follows, X and Y having the previously indicated significance:

(I)         X—CH$_2$—O—CH$_2$—O—Y (II)        X—CH$_2$—O—CH$_2$—O—CH$_2$—X (III)               Y—O—CH$_2$—O—Y

The Formula I represents the desired unsymmetrical formal and Formulae II and III represent the symmetrical formals formed by the disproportionation. The compounds represented by Formula I have been found to be markedly superior in synergistic properties to those represented by Formulae II and III.

It is highly desirable, therefore, that the unsymmetrical formal represented by Formula I be stabilized against disproportionation. This stabilization may be effectively accomplished in accordance with my present invention by substantially increasing the proportion of alcohol used over that theoretically required and also increasing the proportion of formaldehyde (or paraformaldehyde) by an amount equivalent to 1 mole formaldehyde per 2 moles of excess alcohol. The excess alcohol also promotes speed and completeness of the desired reaction.

I have also found that the presence of water in the reacting mixture is essential to the desired reaction and must be retained in the mixture until the reaction is substantially completed. Water is liberated by the reaction of formaldehyde with the alcohol. By that reaction, there is also formed the formal of the alcohol and the hemiacetal. The presence of the liberated water causes the formation of formeldehyde hydrate and also serves to promote conversion of the relatively inactive formal of the alcohol to the more reactive hemiacetal, thus permitting the desired reaction to proceed to completion.

At times, I have found it desirable to supplement the water formed by the reaction by the addition of water to the reacting mixture. I have also found that the desired reaction is further promoted and the desired unsymmertical formal stabilized, as indicated above, by the use of the excess of the alcohol and of formaldehyde.

Following completion of the reaction, as indicated by disappearance of unreacted dihydrosafrole or safrole from the reaction mixture, the water present in the reaction mixture should be substantially completely removed, either by reduced pressure distillation or by azeotropic distillation.

Upon removal of the water, the excess alcohol and excess formaldehyde are apparently converted to the formal of Formula III and this formal is retained in the product and serves to stabilize the desired unsymmetrical formal against disproportionation.

The resultant product consists essentially of the unsymmetrical Formula I stabilized by the presence of symmetrical Formal III, and contains little or no formal of Formula II.

In carrying out the process of my present invention, any of the alcohols conforming to the above-indicated formula may be used. I have found, however, that products having exceptionally high synergistic activity are obtained where R of the alcohol is alkyl of 2 to 4 carbon atoms, for instance as in butoxyethyl alcohol or ethoxyethyl alcohol and especially butoxyethoxyethyl alcohol.

As the strong, nonvolatile acid catalyst, I have, with particular advantage, used p-toluenesulfonic acid. However, in lieu thereof or in conjunction therewith, I may use, for instance, naphthalenesulfonic acid or benzenesulfonic acid.

These acid catalysts serve to promote depolymerization of the paraformaldehyde, when that is used as the source of formaldehyde, and also aids in the reaction. The proportion of acid catalyst used is subject to considerable variation but, for optimum results, should be used in proportions equivalent to a range of from about 8 grams to about 20 grams of acid per mole of safrole or dihydrosafrole in the formulation.

Though not necessary, the reaction may be carried out in the presence of an inert volatile solvent, for instance benzene or hexane, with refluxing to return the solvent and water to the reaction mixture during the reaction, and, upon completion of the reaction, the solvent may be used to carry off the water by azeotropic distillation.

Usually, I prefer to carry the reaction to substantial completion in the absence of such volatile solvents and to eliminate the water from the mixture by low-pressure distillation. However, for experimental purposes, I have in the following examples added hexane after the reaction had been substantially completed and refluxed the mixture over a water trap so as to determine the proportion of water and unreacted constituents in the reaction mixture.

Finally, the product of the reaction should be treated to remove any unreacted formaldehyde and neutralize any acid present and, for this purpose, I have, with advantage, washed the product with an aqueous solution of sodium sulfite. Sodium bicarbonate or other water-soluble base may be used for this purpose but are less effective than sodium sulfite. Such washing operation is, with advantage, accomplished prior to the removal of the volatile solvent, where such solvent is used.

Predicated upon my discoveries hereinbefore described, I use in the process of my present invention the respective reactants and catalyst in the following proportions:

| | | |
|---|---|---|
| Dihydrosafrole or safrole | moles | 1 |
| Alcohol | do | 2 |
| Formaldehyde | do | 2½ |
| Acid catalyst | grams | 8–20 |

I prefer to add the formaldehyde as paraformaldehyde. The paraformaldehyde used in the following examples had a formaldehyde value of 95–96%. For this reason and because some formaldehyde is lost through the removal of water following the reaction, I have used a proportion of formaldehyde slightly in excess of the proportions just noted.

In carrying out the reaction, the alcohol, paraformaldehyde and the acid catalyst are first mixed and heated to a temperature of about 85° C. until at least most of the paraformaldehyde has dissolved. This is usually effected in 20–30 minutes. The solution is then cooled to about 70° C. and the dihydrosafrole or safrole is added and the temperature of the mixture raised rapidly to about 85° C. and maintained at that temperature until the reaction has been substantially completed, usually requiring several days. Water present in the mixture is then removed, either by reduced pressure distillation or azeotropic distillation, and the resultant product is then washed free of acid, advantageously using for this purpose an aqueous solution of sodium sulfite.

The invention will be further illustrated by the following specific examples. It will be understood, however, that these examples are for illustrative purposes and are not intended to be limitative as to the scope of the invention.

*Example I*

In this operation, 162 grams (1 mole) of butoxyethoxyethyl alcohol, 46 grams of paraformaldehyde and 5 grams of p-toluenesulfonic acid were mixed and heated at a temperature of about 85° C. until most of the paraformaldehyde was dissolved. The solution was then cooled to about 75° C. and 86 grams of dihydrosafrole was added. The solution was then heated to 85° C. and maintained at that temperature for three days, at which time the reaction had been substantially completed. There was then added to the reaction mixture, after it had cooled to about 70° C., 100 cc. of normal hexane and the solution was heated with refluxing over a water trap for three hours, during which period there was collected in the water trap 19 cc. of an aqueous solution containing 6.3 grams of $CH_2O$. The remaining product was then washed with an aqueous solution of sodium sulfite resulting in the extraction of an additional 1.68 grams of formaldehyde. Formaldehyde polymer equivalent to about 1 gram of formaldehyde was found in the condenser. The 46 grams of paraformaldehyde used was the equivalent of 43.7 grams formaldehyde. Consequently, the amount of formaldehyde reacted and retained in the product was 34.72 grams or about 80% of the formaldehyde used. Upon distillation of the hexane at 95° C. under reduced pressure, the product obtained weighed 271 grams, as compared with the theoretical yield of 268 grams.

440 milligrams of the product of the foregoing example and 30 milligrams of pyrethrins were dissolved in 100 cc. of an odorless base oil and the solution tested against houseflies by the Peet-Grady method, showing a knockdown of 96.6% and a kill of 95%, as compared with the OTI knockdown of 96.1% and a kill of 53.9%.

Tests made under similar conditions using 300 milligrams of the product and 30 milligrams of allethrin per 100 cc. of odorless base oil showed a knockdown of 82.3% and a kill of 38.2%, as compared with the OTI knockdown of 93.4% and kill of 30.8%.

*Example II*

In this example, reactants and catalyst in the following proportions were used:

| | |
|---|---|
| Dihydrosafrole | 82 grams (0.5 mole). |
| Butoxyethoxyethyl alcohol | 162 grams (1 mole). |
| Paraformaldehyde | 44 grams (equivalent to 1.25+ moles of formaldehyde). |
| p-Toluenesulfonic acid | 10 grams. |
| Water | 5 grams. |

As in Example I, the alcohol, paraformaldehyde, acid and water were mixed and heated to a temperature of 85° C. until substantially all of the paraformaldehyde had become dissolved. The solution was then cooled to approximately 70° C. and the dihydrosafrole added. The solution was then heated to about 85° C. and maintained at that temperature for about 3 days. Thereafter, 100 cc. of benzene was added to the reaction mixture and the heating was continued for about 30 minutes to remove the water. The benzene solution was then washed with an aqueous solution of 5 grams of sodium bicarbonate and 4.2 grams of sodium sulfite to remove unreacted formaldehyde and neutralize the acid. The benzene was then distilled off at reduced pressure at a temperature of 95° C. leaving a product weighing 259 grams, as compared with the theoretical yield of 268 grams. Upon further heating of the product at reduced pressure at a temperature of 200° C., 8.4 grams of unreacted constituents were driven off leaving a product equivalent to 96% of the theoretical yield.

*Example III*

In this operation, the following reactants were used in the indicated proportions:

Safrole _____ 85 grams.
Butoxyethoxyethyl alcohol_____ 162 grams (1 mole).
Paraformaldehyde_____ 46 grams.
p-Toluenesulfonic acid_____ 5 grams.

The alcohol, paraformaldehyde and acid catalyst were mixed and heated to a temperature of 85° C. until most of the paraformaldehyde had dissolved. The solution was then cooled to about 70° C. and the safrole was added. The temperature was then rapidly raised to about 85° C. and the solution was maintained at that temperature for three days. The resultant solution was then permitted to cool to about 70° C. and 100 cc. of normal hexane was added and the mixture heated with refluxing over a water trap for 3 hours.

There was obtained 18.6 cc. of an aqueous solution containing 6.2 grams of formaldehyde. The remaining product was then washed with an aqueous solution of 12.8 grams of sodium sulfite (anhydrous) to remove unreacted formaldehyde and neutralize the acid, which resulted in the extraction of 1.17 grams formaldehyde. Approximately 0.5 gram of formaldehyde polymer was found in the condenser, giving a total of 7.87 grams of unreacted formaldehyde and 35.83 grams of reacted formaldehyde retained in the product, equivalent to 95.5% of the calculated requirement of formaldehyde.

The hexane was then distilled off at reduced pressure leaving 269 grams of the dark-colored product.

An insecticidal composition composed of 440 milligrams of the product of the foregoing example and 30 milligrams of pyrethrins in 100 cc. of odorless base oil when tested against houseflies by the Peet-Grady method gave a knockdown of 96.6% and a kill of 95.7%, as compared with an OTI knockdown of 96.1% and a kill of 53.9%.

Tests made under similar conditions using a concentration of 300 milligrams of the product and 30 milligrams of allethrin per 100 cc. of odorless base oil showed a knockdown of 79.2% and a kill of 42.5%, as compared with the OTI knockdown of 93.4% and kill of 30.8%.

In the foregoing example, the safrole used was of about 95% purity and, consequently, somewhat in excess of one-half mole was used in the formula. Accordingly, the yield closely approximated the calculated yield for a one-half mole batch.

95 grams of a product produced in accordance with the present example was heated to about 200° C. at reduced pressure for removal of any unreacted safrole and alcohol. This resulted in a residue of 78 grams.

*Example IV*

In this operation, the reactants and proportions thereof were as follows:

| | Grams |
|---|---|
| Safrole | 81 |
| Butoxyethoxyethyl alcohol | 162 |
| Paraformaldehyde | 44 |
| p-Toluenesulfonic acid | 5 |
| Water | 5 |

The alcohol, paraformaldehyde, acid catalyst and water were heated together, as previously described, until the paraformaldehyde was substantially completely dissolved. The safrole was then added and the mixture rapidly heated to 85 °C.

Three batches were made as just described, one being maintained at 85° C. for 5 days, another for 6 days and another for 7½ days. Thereafter, 100 cc. of normal hexane was added to the respective batches and the resultant solutions subjected to refluxing to drive off the water and the solutions washed free of acid and the hexane distilled off at reduced pressure, as previously described. The yield from the batch which had been maintained at 85° C. for 5 days was 91% of the theoretical yield, that maintained 6 days at 85° C. was 94.8% of the theoretical yield and that maintained at the 85° C. temperature for 7½ days 94.6% of the theoretical yield.

Four additional batches were produced as just described except that 10 grams of the toluenesulfonic acid was used. Following the addition of the safrole, the mixtures were heated at 85° C. for 3 days. Upon adding the hexane and distilling off the hexane and water at reduced pressure, etc., as just described, the yields of the respective batches were 92%, 92.3%, 93.4% and 89.3%. A similar batch in which the added water was increased to 10 grams gave a yield of 93.4%.

*Example V*

In this operation, the reactants and proportions thereof were as follows:

Safrole_____ 81 grams.
Ethoxyethoxyethyl alcohol_____ 134 grams (1 mole).
Paraformaldehyde_____ 44 grams.
p-Toluenesulfonic acid_____ 5 grams.

Following addition of the safrole, the mixture was maintained at a temperature of 85° C. for 3 days. As in the preceding examples, the paraformaldehyde was dissolved in the alcohol-acid solution prior to the addition of the safrole. The water was distilled from the reaction product at reduced pressure, as distinguished from azeotropic distillation, and the product was then dissolved in 100 cc. of benzene and washed free of acid and residual formaldehyde with an aqueous solution of sodium sulfite. The solvent was then removed from the product by distillation at reduced pressure. By this procedure, there was obtained a yield of 230.5 grams, as compared with a theoretical yield of 239 grams. Upon higher temperature distillation at reduced pressure, the product was found to contain 17.9 grams of distillable material, leaving an amount of product equivalent to 82% of the theoretical yield.

An insecticidal composition composed of 300 milligrams of the product of the foregoing example and 30 milligrams of pyrethrins per 100 cc. of odorless base oil, when tested by the Peet-Grady method gave a knockdown of 87.7% and a kill of 74.3%, as compared with the OTI knockdown of 93.4% and a kill of 30.8%. Similar tests using a concentration of 300 milligrams of the product and 30 milligrams of allethrin per 100 cc. of the base oil showed a knockdown of 81% and a kill of 46.5%, as compared with an OTI knockdown of 93.4% and a kill of 38%.

Example VI

In this operation, the following reactants were used in the indicated proportions:

| | |
|---|---|
| Safrole | 81 grams (0.5 mole). |
| Butoxethyl alcohol | 118 grams (1 mole). |
| Paraformaldehyde | 44 grams. |
| p-Toluenesulfonic acid | 4 grams. |

Prior to the addition of the safrole, the mixture was heated until the paraformaldehyde was substantially completely dissolved, as in the preceding examples, and following the addition of the safrole the mixture was heated at 85% for 3 days. Following completion of the reaction, the water present in the reaction mixture was refluxed into a water trap and the product washed free from acid and residual formaldehyde, all as previously described, yielding a product of 221 grams, as compared with the theoretical yield of 223 grams.

It will be understood that the insecticidal composition herein designated OTI, i.e., Official Test Insecticide, was composed of 100 milligrams of pyrethrins dissolved in 100 cc. of an odorless base oil of the type conventionally used as the vehicle for such insecticidal composition.

I claim:

1. A composition consisting essentially of a compound of the formula

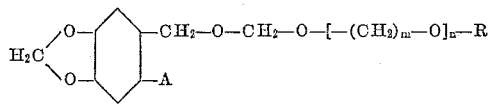

in which A represents a substituent selected from the group consisting of normal propyl and allyl, R is alkyl of from 1 to 4 carbon atoms, $m$ is an integer from 2 to 3 and $n$ is an integer from 1 to 2, stabilized against disproportionation by the presence of the formal of an alcohol of the formula $R-[O-(CH_2)_m]_n-OH$, R, $m$ and $n$ being identical with those of the compound of said generic formula.

2. A composition of claim 1 in which R is butyl, A is allyl, $m$ is the integer 2 and $n$ is the integer 2.
3. A composition of claim 1 in which R is ethyl, A is allyl, $m$ is the integer 2 and $n$ is the integer 2.
4. A composition of claim 1 in which R is butyl, A is normal propyl, $m$ is the integer 2 and $n$ is the integer 2.
5. A composition of claim 1 in which R is ethyl, A is normal propyl, $m$ is the integer 2 and $n$ is the integer 2.
6. The method of producing a composition of claim 1 which comprises mixing a strong, nonvolatile acid catalyst selected from the group consisting of toluenesulfonic acid, naphthalenesulfonic acid and benzenesulfonic acid, paraformaldehyde and an alcohol of the formula $R-[-O-(CH_2)_m]_n-OH$, in which R is alkyl of from 1 to 4 carbon atoms, $m$ is an integer from 2 to 3 and $n$ is an integer from 1 to 2, heating the mixture until the paraformaldehyde is substantially completely dissolved, adding to the mixture a methylenedioxyphenyl derivative of the group consisting of dihydrosafrole and safrole, maintaining the temperature of the mixture at about 85° C. until the reaction has been completed, while retaining in the mixture water formed by the reaction, and thereafter separating the water from the reaction mixture, the proportions of the reactants and catalyst being substantially as follows:

| | |
|---|---|
| Methylenedioxyphenyl derivative | moles 1 |
| Alcohol | do 2 |
| Paraformaldehyde, equivalent to 2½ moles CH₂O. | |
| Acid catalyst | grams 8–20 |

7. The method of claim 6 in which a minor proportion of water is added prior to the addition of the methylenedioxyphenyl derivative.
8. The method of claim 6 in which the alcohol constituent is butoxyethoxyethyl alcohol.
9. The method of claim 6 in which the acid catalyst is toluenesulfonic acid.
10. The method of claim 6 in which the alcohol constituent is ethoxyethoxyethyl alcohol.

References Cited in the file of this patent

UNITED STATES PATENTS

| | | |
|---|---|---|
| 2,431,844 | Synerholm | Dec. 2, 1947 |
| 2,485,681 | Wachs | Oct. 25, 1949 |
| 2,494,458 | Synerholm | Jan. 10, 1950 |
| 2,550,737 | Wachs | May 1, 1951 |
| 2,764,517 | Beroza | Sept. 25, 1956 |
| 2,832,792 | Beroza | Apr. 29, 1958 |
| 3,070,607 | Barthel et al. | Dec. 25, 1962 |

OTHER REFERENCES

Moore et al.: J. of the Science of Food and Agr., vol. 9, pages 666–672 (1958).

Alexander et al.: "J. Org. Chem.," vol. 23, pages 1969–1970 (1958).

Beroza: J. of Agr. and Food Chemistry, vol. 4, pages 49–53 (1956).

The Merck Index, 7th ed., 1960, pub. by Merck & Co., Inc., Rahway, N.J., pages 581 and 915.

Sweeney: Chem. Abs., vol. 52, page 643e, 1958.